United States Patent [19]

Gedalovitz

[11] Patent Number: 5,328,032
[45] Date of Patent: Jul. 12, 1994

[54] FLEXIBLE SHEET STORAGE DEVICE

[75] Inventor: Eliyahu Gedalovitz, Rehovot, Israel

[73] Assignee: Scitex Corporation, Herzlia Bet., Israel

[21] Appl. No.: 3,046

[22] Filed: Jan. 11, 1993

[30] Foreign Application Priority Data

Mar. 13, 1992 [IL]  Israel .................................. 101215

[51] Int. Cl.⁵ .................................................. B65D 85/30
[52] U.S. Cl. ...................................... 206/455; 271/187; 355/75; 414/793.9
[58] Field of Search .................... 355/75, 40; 206/449, 206/455; 414/301, 792.7, 793.9; 271/187, 315

[56] References Cited

U.S. PATENT DOCUMENTS

| | | | |
|---|---|---|---|
| 3,410,190 | 11/1968 | Browning | 355/75 X |
| 3,512,771 | 5/1970 | Dempsey | 271/187 X |
| 3,894,479 | 7/1975 | Anikanov et al. | 414/793.9 X |
| 3,904,192 | 9/1975 | Pfeifer et al. | 271/187 X |
| 3,912,255 | 10/1975 | McInerny | 271/315 |
| 4,470,590 | 9/1984 | Ariga et al. | 271/187 |
| 4,595,193 | 6/1986 | Nakamura | 271/187 |
| 5,040,663 | 8/1991 | Gould et al. | 414/793.9 X |

*Primary Examiner*—Bryon P. Gehman
*Attorney, Agent, or Firm*—Benjamin J. Barish

[57] ABSTRACT

A flexible sheet storage device includes a releasable holder located within a container to receive the leading edge of each sheet as it is inserted via a slot into the container, and an angularly displaceable mounting for a releasable holder effective to angularly displace the releasable holder, and the leading edge of the sheet held thereby, a sufficient angular distance until the leading edge of the inserted sheet passes the trailing edge of any previously inserted sheets before the holder releases the leading edge of the inserted sheet and permits the inserted sheet to fall by gravity on top of previously inserted sheets.

20 Claims, 5 Drawing Sheets

FLEXIBLE SHEET STORAGE DEVICE

FIELD AND BACKGROUND OF THE INVENTION

The present invention relates to flexible sheet storage devices. The invention is particularly applicable for storing the negatives generated by a laser plotter, and is therefore described below with respect to such an application, but it will be appreciated that the invention could advantageously be used in other flexible sheet storage devices.

Negatives generated by a laser plotter are commonly stored in sheet form in an optically sealed container or cassette. Thus, the negative is inserted through an inlet slot formed in the top wall of the cassette and drops by gravity to rest against the bottom and side walls. However, the negatives are of different lengths and widths, and therefore some may come to rest in the container with their trailing edges located so as to interfere with subsequently-inserted negatives. Thus, the leading edge of a subsequently-inserted negative may engage the trailing edge of a previously-inserted negative preventing the subsequently-inserted one from completely entering the cassette or from falling freely by gravity to the bottom of the cassette, thereby not only jamming the cassette, but also kinking the negative and possibly even scratching it.

OBJECTS AND BRIEF SUMMARY OF THE INVENTION

An object of the present invention is to provide a flexible sheet storage device having advantages in the above respects. Another object of the invention is to provide a storage device having a capacity for storing a large number of sheets in an orderly manner.

According to the present invention, there is provided a flexible sheet storage device, comprising: a container including a top wall formed with an inlet slot for inserting the sheets to be stored, and further including bottom and side walls for receiving the sheets inserted through the inlet slot; a releasable holder located within the container to receive the leading edge of each sheet as it is inserted via the slot into the container; and an angularly displaceable mounting for the releasable holder effective to angularly displace the releasable holder, and the leading edge of the sheet held thereby, a sufficient angular distance until the leading edge of such inserted sheet passes the trailing edge of any previously inserted sheets before the holder releases the leading edge of the inserted sheet and permits the inserted sheet to fall by gravity on top of previously inserted sheets.

A number of embodiments of the invention are described below for purposes of example.

According to some described embodiments, the releasable holder comprises a guide member formed with a pair of projections spaced from each other in the direction in which the guide member is angularly displaced by the mounting to define, between the projections, a recess for receiving and for releasably holding the leading edge of each inserted sheet. Described examples of such a guide member include a drum formed with at least a pair of such projections, but preferably with a plurality of such projections spaced around the circumference of the drum. Other examples of such a guide member include toothed discs formed with a plurality of teeth around their circumference.

According to further described examples, the releasable holder may include a suction nozzle, or a magnetic element, for releasably holding the leading edge of the inserted sheet until it has moved a sufficient angular distance so as to clear the trailing edge of any previously inserted sheets.

According to further features in the described preferred embodiments of the invention, the bottom and/or side walls of the container may be specially configured to increase their surface areas for receiving the sheets as each is inserted into the container.

A flexible sheet storage device constructed in accordance with the foregoing features enables each sheet to be inserted into the container without interference from any preceding sheets, such as to permit a large number of sheets to be stored in the container in a neat and orderly manner with a minimum possibility of scratching, kinking or otherwise damaging the sheets. The foregoing advantages of such a flexible sheet storage device makes the device particularly useful as a cassette for storing negatives generated by laser plotters.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figures 1, 2:
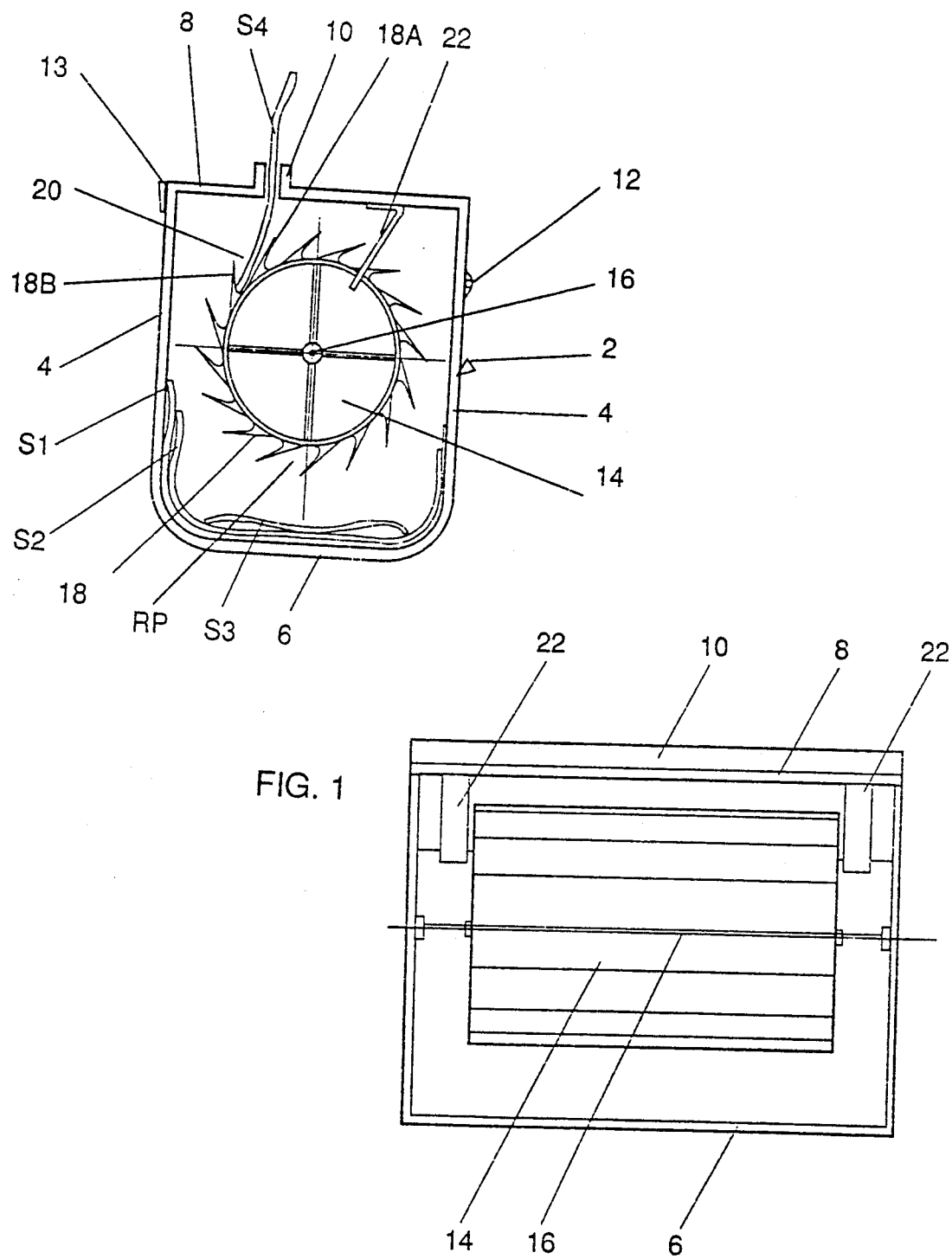
FIG. 1 is an end view diagrammatically illustrating one form of flexible sheet storage device constructed in accordance with the present invention.
FIG. 2 is a side elevational view diagrammatically illustrating the storage device of FIG. 1.

The flexible sheet storage device illustrated in FIGS. 1 and 2 of the drawings is particularly useful for storing the negatives produced by a laser plotter, although of course it could be used for storing other types of flexible sheets. The illustrated device includes a container 2 having side walls 4, a bottom wall 6, and a top wall 8 formed with an elongated slot 10 for inserting the sheets to be stored within the container. In the example illustrated, the top wall 8 is in the form of a lid pivotally mounted to a side wall 4 by a hinge 12 and releasably retained closed by a closure to provide access into the interior of the container.

A drum 14 is rotatably mounted about a horizontal axis 16 within the container 2. Drum 14 is formed with a plurality of blades 18 which extend longitudinally of the drum and are circumferentially spaced from each other so as to define a recess 20 between each pair of blades. As shown particularly in FIG. 1, each of the blades 18 is mounted at one end 18a to the drum so as to extend substantially tangentially outwardly of the outer surface of the drum.

Drum 14 is mounted within container 2 such that when a sheet is inserted through the inlet slot 10, the leading edge of the sheet is received within one of the spaces 20 between the pair of blades 18 underlying the slot. The drum is freely rotatable on its horizontal axis 16 so that the weight of the sheet, when received in a space 20 between two blades, rotates the drum in the direction of the arrow illustrated in FIG. 1. The blades 18 are of a sufficient width (in the dimension outwardly of the drum) so that they releasably hold the leading edge of the so-inserted sheet until the drum rotates a sufficient angular distance to bring the leading edge of the inserted sheet past the trailing edges of all the previously-inserted sheets. At that time, the inserted sheet is released and permitted to fall by gravity on top of the previously-inserted sheets.

For purposes of example, the container 2 illustrated in FIG. 1 illustrates the condition wherein three sheets $S_1$, $S_2$ and $S_3$ have been previously inserted into the container, with a fourth sheet $S_4$ now being inserted. When the inserted sheets are negatives produced by a laser plotter, the sheets are relatively heavy and slippery, so that each inserted sheet slides with respect to the container walls and/or the previously-inserted sheets such that the leading edge of each such inserted sheet assumes substantially the same level as its trailing edge. Thus, as shown in FIG. 1, the first inserted sheet $S_1$ is relatively long, so that its leading and trailing edges assume a relatively high level against the side walls 4 of the container; the second inserted sheet $S_2$ is of shorter length so that its leading and trailing edges reach a lower level against the side walls of the container; and the third inserted sheet $S_3$ is relatively short so that it lies relatively flat against the bottom portions of sheets $S_1$, $S_2$.

In this example, when sheet $S_4$ is inserted through the inlet slot 10, its leading edge is received within the space 20 between the two underlying blades 18, causing the drum 14 to rotate by the weight of the inserted sheet. As the drum 14 is so rotated, its blades 18 hold the leading edge of the inserted sheet $S_4$ until the leading edge reaches approximately the point indicated as RP (release point), at which time the blades 18 release the leading edge of sheet $S_4$ and permit the sheet to fall by gravity on top of the three previously inserted sheets $S_1$–$S_3$. It will be seen that this release point RP is past the trailing edges of all the previously-inserted sheets, so that none of the previously-inserted sheets will interfere with the sheet then being inserted. The weight of the inserted sheet and its slippery nature will cause the sheet to slide along the previously-inserted sheets until the level of its leading edge comes up to about the level of its trailing edge.

Should drum 14, for any reason, fail to release the leading edge of the inserted sheet $S_4$, a pair of stripper blades 22, fixed to the top wall 8 of the container 2 and straddling the opposite sides of drum 14, will strip the inserted sheet from the drum and permit it to fall by gravity on top of the previously-inserted sheets.

Figure 3:
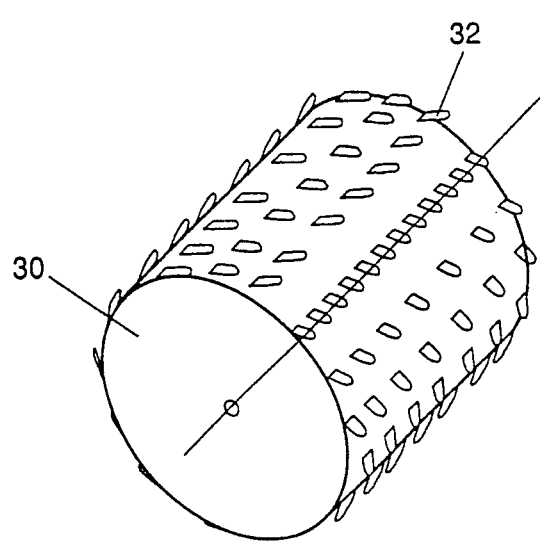
FIGS. 3–7 are three-dimensional views illustrating other types of releasable holders that may be used in the sheet storage device of FIGS. 1 and 2.

FIG. 3 illustrates a variation wherein the drum, therein designated 30, is formed with a plurality of projections 32, instead of the blades (18), for releasably holding the leading edge of the inserted sheet. As shown in FIG. 3, projections 32 are arranged in longitudinally-extending, circumferentially-spaced lines around the circumference of the drum, but could follow other arrangements.

Figure 4:
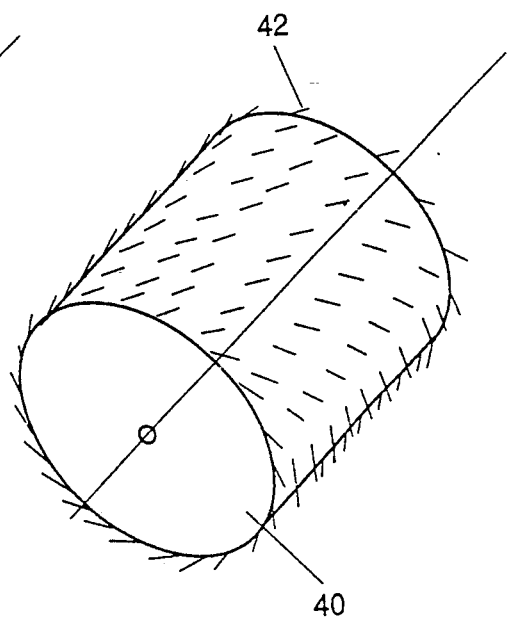

FIG. 4 illustrates the variations wherein the drum 40, includes projections in the form of bristles 42 projecting from the outer face of the drum. Bristles 42 are also disposed in longitudinally-extending, circumferentially-spaced lines around the drum circumference, but could also follow other arrangements.

Figure 5:
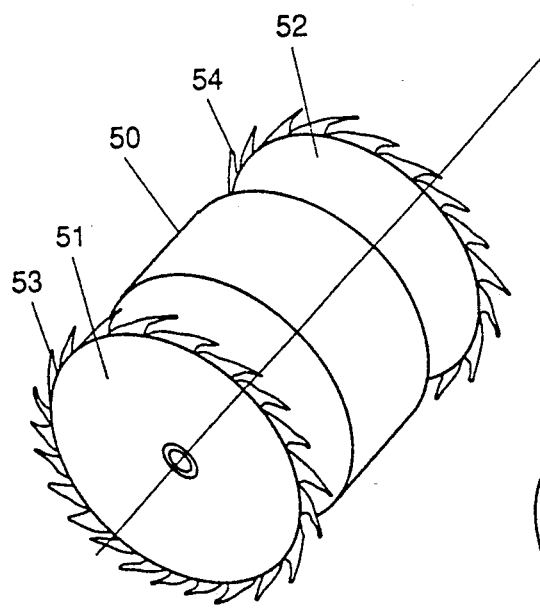

FIG. 5 illustrates a variation wherein the drum 50 includes a pair of toothed discs 51, 52 on its opposite sides. The two discs are formed with a plurality of teeth 53, 54 projecting from the outer face of the discs, and therefore of the drum 50, to engage the leading edge of the inserted sheet.

Figure 6:
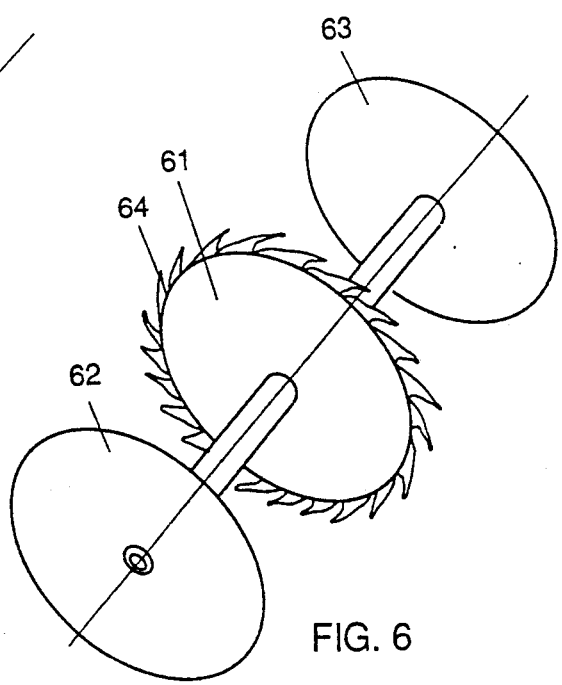

FIG. 6 illustrates a variation wherein the drum is replaced by three discs 61, 62, 63, all rotatably mounted about a horizontal axis, corresponding to axis 16 in FIG. 1. The middle disc 61 is formed with a plurality of teeth 64 serving as the projections for releasably holding the leading edge of the inserted sheet, whereas the end discs 62 and 63 are not toothed.

Figure 7:
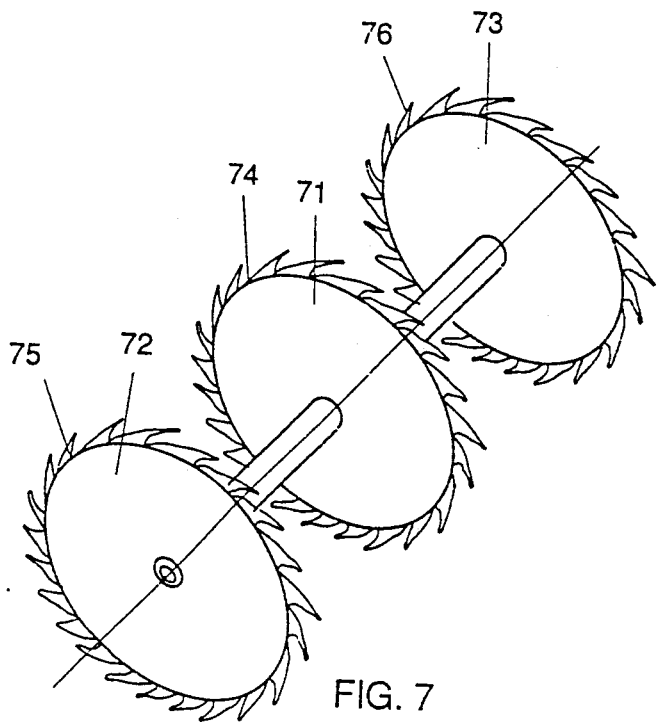

FIG. 7 illustrates a variation similar to that of FIG. 6, also including three discs 71, 72 and 73, but in this case all three discs are formed with teeth, as shown at 74, 75 and 76, which serve as the projections for releasably holding the inserted sheet.

Figure 8:
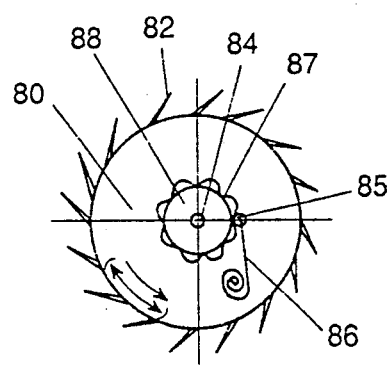
FIGS. 8–14 are end views diagrammatically illustrating still additional types of releasable holders that may be used in the sheet storage device of FIGS. 1 and 2.

FIG. 8 illustrates a drum, therein designated 80, similar to drum 14 in FIGS. 1 and 2, and also formed with a plurality of longitudinally-extending blades 82, corresponding to blades 18 in FIGS. 1 and 2. Drum 80 is similarly rotatably mounted about a horizontal axis 84. In the variation of FIG. 8, however, the drum is releasably retained in a rotated position by a retainer element 85 urged by a spring 86 into detents 87 formed in a disc 88 secured to the drum 80. Retainer element 85 thus releasably retains the drum in its rotated position, e.g., to align a recess (e.g., 20, FIG. 1) with the inlet slot (10, FIG. 1) to assure the entry of the inserted sheet into the recess.

Figure 9:
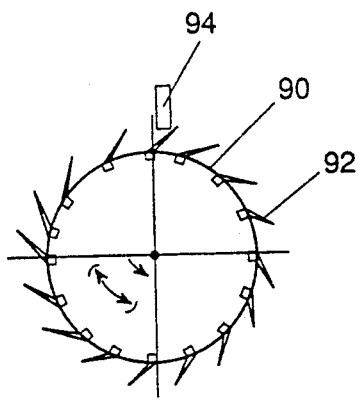

FIG. 9 illustrates a variation wherein the drum 90 also includes a plurality of blades 92. In this case, the blades are of magnetic material and cooperate with a magnet 94 which releasably retains the drum in its rotated position.

Figure 10:
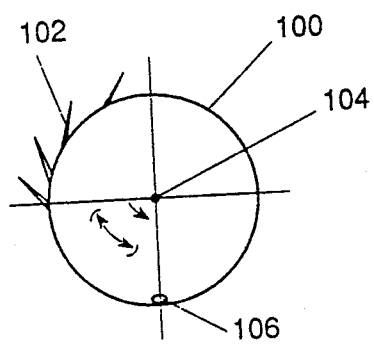

FIG. 10 illustrates a variation wherein the drum 100 also includes a plurality of blades 102, but does not make a 360° rotation about its rotary axis 104; rather, the drum includes a weight 106. The weight is at the bottom of the drum in its normal position, such that the weight 106 is raised during the rotation of the drum by the inserted sheet, and returns the drum to its normal position as soon as the sheet is released from the drum. Since the drum 100 does not rotate 360°, it only requires blades 102 for a portion of its outer circumference, e.g., for about 90° as shown in FIG. 10.

Figure 11:
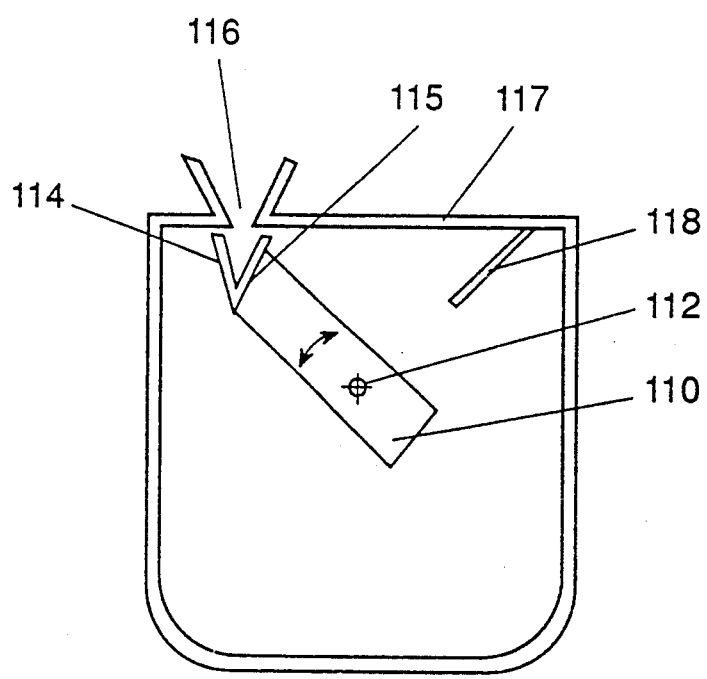

FIG. 11 illustrates an arrangement wherein the guide member receiving the leading edge of the inserted sheet is not in the form of a drum, but rather in the form of an arm 110 which is pivotally mounted about a horizontal axis 112. Arm 110 includes a pair of blades 114, 115, defining a recess for receiving a sheet inserted via the inlet slot 116 formed in the top wall of the container 117. The two blades 114, 115 thus releasably hold the leading edge of the inserted sheet as arm 110 pivots about axis 112 until the leading edge passes the trailing edges of all the previously-inserted sheets, as described above with respect to FIGS. 1 and 2. The arrangement illustrated in FIG. 11 also includes a stripper blade 118 adapted to engage the leading edge of the inserted sheet should it fail to be released by gravity from the two blades 114, 115.

Figure 12:
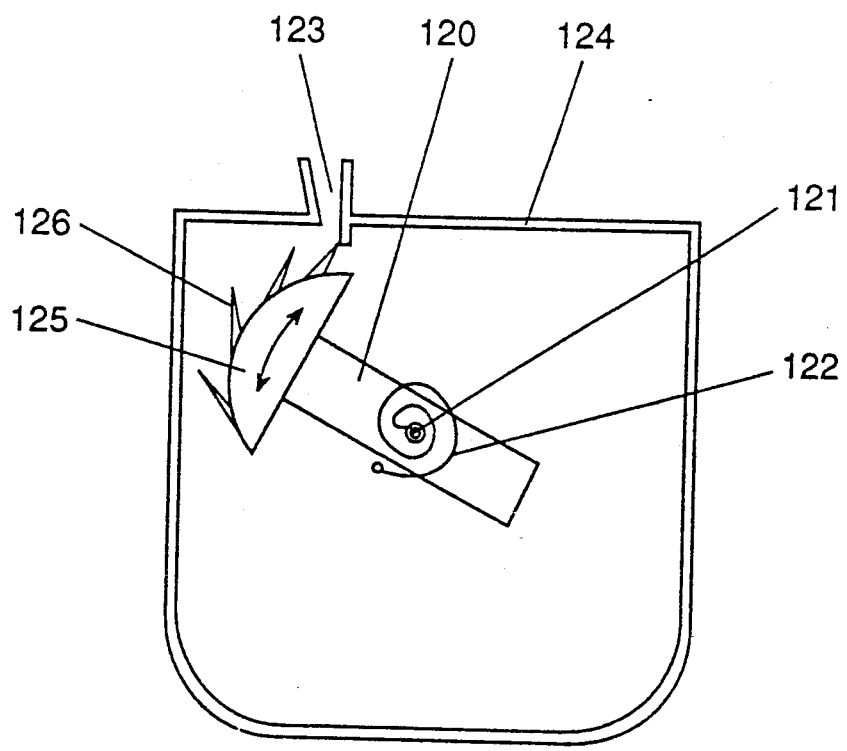

FIG. 12 illustrates a variation wherein the guide member, engageable with the leading edge of the inserted sheet, is in the form of a lever 120 which is pivotally mounted at 121 and urged by spring 122 to the illustrated normal position underlying the inlet slot 123 in the housing 124. In this case, the end of arm 120 carries a sector of a drum 125 formed with a plurality of blades 126 for releasably engaging, between them, the leading edge of the inserted sheet and for holding that edge until it passes the trailing edges of the previously-inserted sheets, as described above, before releasing the sheet and permitting it to fall by gravity to the bottom of the container.

Figure 13:
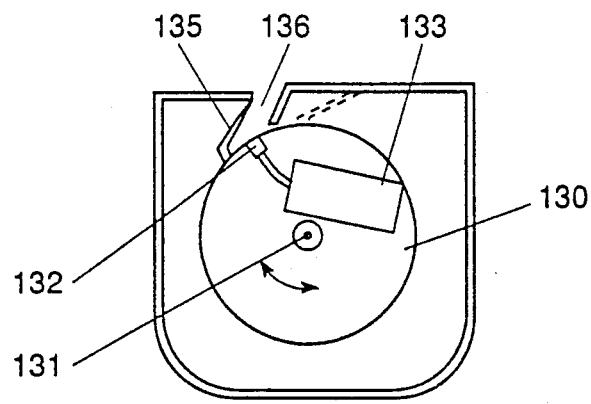

FIG. 13 illustrates a variation wherein the guide member also includes a drum 130 rotatably mounted about a horizontal axis 131. In this case, however, the releasable holder carried by the drum is in the form of a suction nozzle 132 supplied by suction from a unit 133 which releasably holds the leading edge of the sheet until it passes the trailing edges of the previously-inserted sheets, whereupon the suction to nozzle 132 is turned off to release the leading edge of the sheet and to permit the sheet to fall by gravity to the bottom of the container. Drum 130 includes a blade 135 which engages the leading edge of the sheet inserted via the inlet slot 136 to position it in alignment with the suction nozzle 132, and thereby to permit the nozzle to releasably hold the sheet leading edge as described above.

Figure 14:
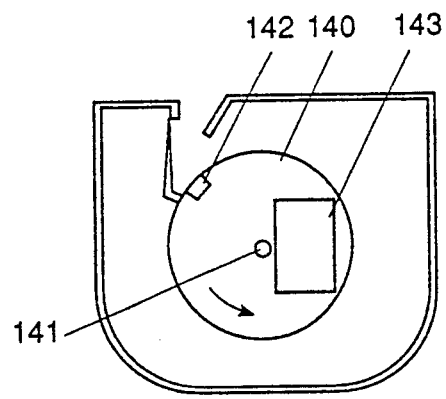
Figure 15:
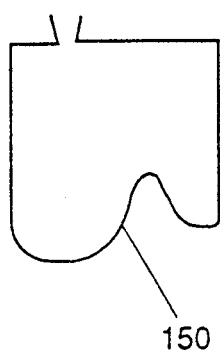
FIGS. 15–20 are end view diagrammatically illustrating various special configurations of the bottom and side walls of the container in such a flexible sheet storage device for increasing the surface area of the container receiving the sheets as each is inserted into the container, thereby enabling the container of given volume to receive long sheets.
Figure 16:
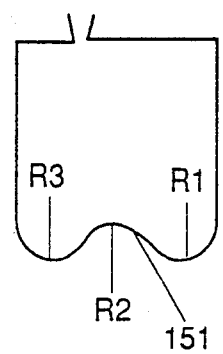
Figure 17:
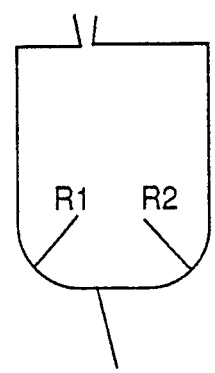
Figure 18:
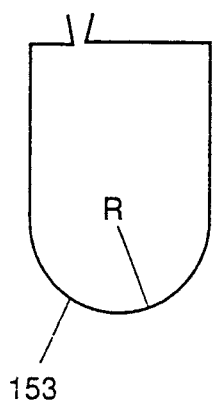
Figure 19:
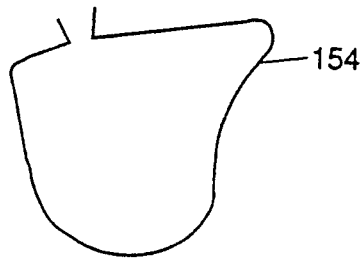
Figure 20:
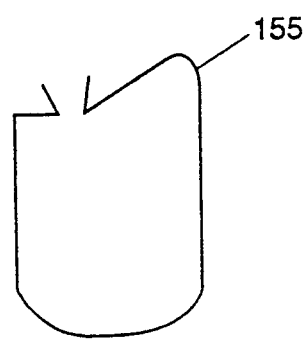

FIG. 14 illustrates a variation similar to that of FIG. 13, including a drum 140 rotatably mounted about a horizontal axis 141. In this case, however, the inserted sheet is made of or includes at its leading edge a magnetizable element, and its leading edge is held to the drum 140 by a magnet 142 controlled by a magnetic field generator 143, until the leading edge passes the trailing edges of the previously-inserted sheets, whereupon the magnet releases the leading edge to permit the sheet to fall by gravity on top of the previously-inserted sheets.

The drums in FIGS. 13 and 14 are preferably driven by an external drive (not shown) to overcome the forces produced by the suction nozzle (132, FIG. 13) and magnetic field generator (143, FIG. 14), respectively.

FIGS. 15–20 illustrate various configurations of bottom and side walls that may be provided the container in order to increase the sizes of the sheets capable of being received by the container. Thus, whereas the bottom and side walls in the previously-described containers are relatively flat, in FIGS. 15 and 16 the bottom wall is relatively serpentine, as shown at 150 and 151; in FIGS. 17 and 18, the bottom wall is joined by rounded juctures to the side walls, as shown at 152 and 153; in FIG. 19, the side wall is formed with a dished configuration, as shown at 154; and in FIG. 20, one side wall is elongated so as to extend above the end of the opposite side wall, as shown at 155.

While the invention has been described with respect to a number of embodiments, it will be appreciated that these are set forth merely for purposes of example, and that many other variations, modifications and applications of the invention may be made.

What is claimed is:

1. A flexible sheet storage device, comprising:
    a container including a top wall formed with an inlet slot for inserting sheets to be stored, and further including bottom and side walls for receiving the sheets inserted through said inlet slot;
    a holder located within said container to releasably receive the leading edge of each sheet as it is inserted via said slot into the container;
    an angularly displaceable mounting for said holder effective to angularly displace the holder, and the leading edge of a sheet held by the holder, a sufficient angular distance until the leading edge of an inserted sheet passes the trailing edge of any previously inserted sheets before the holder releases the leading edge of the inserted sheet and permits the inserted sheet to fall by gravity on top of previously inserted sheets;
    and a fixed stop engageable with the leading edge of a sheet held by said holder after the sheet has been displaced said sufficient angular distance, for stripping the sheet from the holder.

2. The device according to claim 1, wherein said releasable holder comprises a guide member formed with a pair of projections spaced from each other in the direction in which the guide member is angularly displaced by said mounting, to define, between said projections, a recess for receiving and for releasably holding the leading edge of each inserted sheet.

3. The device according to claim 2, wherein said guide member is a drum formed with said pair of projections, and said angularly displaceable mounting is a rotary mounting for said drum.

4. The device according to claim 3, wherein said drum is formed with a plurality of said projections around its circumference.

5. The device according to claim 4, wherein said projections are blades extending longitudinally of the drum and circumferentially spaced around the drum.

6. The device according to claim 4, wherein said projections are disposed in longitudinally-extending, circumferentially-spaced lines around said drum.

7. The device according to claim 4, wherein said projections are bristles projecting from the outer face of the drum.

8. The device according to claim 1, wherein said releasable holder includes a suction nozzle for releasably holding the leading edge of an inserted sheet.

9. The device according to claim 1, wherein said releasable holder includes a magnetic element for releasably holding the leading edge of an inserted sheet.

10. The device according to claim 1, wherein both the bottom and side walls are specially configured to increase their surface areas for receiving sheets as each is inserted into the container.

11. A flexible sheet storage device, comprising:
    a container including a top wall formed with an inlet slot for inserting sheets to be stored, and further including bottom and side walls for receiving the sheets inserted through said inlet slot;
    a holder located within said container to releasably receive the leading edge of each sheet as it is inserted via said slot into the container;
    and an angularly displaceable mounting for said holder effective to angularly displace the holder, and the leading edge of a sheet held by the holder, a sufficient angular distance until the leading edge of an inserted sheet passes the trailing edge of any previously inserted sheets before the holder releases the leading edge of the inserted sheet and permits the inserted sheet to fall by gravity on top of previously inserted sheets;

said holder comprising a guide member formed with a pair of projections spaced from each other in the direction in which the guide member is angularly displaced by said mounting, to define, between said projections, a recess for receiving and for releasably holding the leading edge of each inserted sheet;

said guide member including at least one toothed disc formed with a plurality of teeth around its circumference; said angularly displaceable mounting being a rotary mounting for said guide member.

12. The device according to claim 11, wherein said guide member includes a drum and a pair of toothed discs at each of the opposite ends of said drum.

13. The device according to claim 11, wherein said guide member includes a pair of untoothed discs on opposite sides of one toothed disc.

14. The device according to claim 11, wherein said guide member includes second and third toothed discs on opposite sides of said at least one toothed disc.

15. The device according to claim 11, wherein said guide member includes spring-biassed retainer means for releasably retaining the guide member in a rotated position.

16. The device according to claim 11, wherein said guide member includes a weight which normally returns the guide member to an initial position after releasing the leading edge of an inserted sheet.

17. The device according to claim 11, wherein said guide member includes a pair of projections in the form of blades, and said angularly displaceable mounting is a pivotal mounting for said guide member.

18. The device according to claim 17, wherein said guide member is a sector of a drum.

19. The device according to claim 11, wherein said guide member constitutes the sector of a circle and is pivotally mounted.

20. A flexible sheet storage device, comprising:

a container including a top wall formed with an inlet slot for inserting sheets to be stored, and further including bottom and side walls for receiving the sheets inserted through said inlet slot;

a holder located within said container to releasably receive the leading edge of each sheet as it is inserted via said slot into the container;

and an angularly displaceable mounting for said holder effective to angularly displace the holder, and the leading edge of a sheet held by the holder, a sufficient angular distance until the leading edge of an inserted sheet passes the trailing edge of any previously inserted sheets before the holder releases the leading edge of the inserted sheet and permits the inserted sheet to fall by gravity on top of previously inserted sheets;

both said bottom and side walls being specially configured to increase their surface areas for receiving the sheets as each is inserted into the container.

* * * * *